US012626991B2

(12) United States Patent
Hofer et al.

(10) Patent No.: US 12,626,991 B2
(45) Date of Patent: May 12, 2026

(54) MOTOR VEHICLE WITH A HIGH VOLTAGE BATTERY

(71) Applicant: MAGNA STEYR Fahrzeugtechnik GmbH & Co KG, Graz (AT)

(72) Inventors: Bernhard Hofer, Graz (AT); Thomas Mokina, Seiersberg (AT); Werner Schwarzl, Lassnitzhoehe (AT)

(73) Assignee: MAGNA STEYR Fahrzeugtechnik GmbH & Co KG, Graz (AT)

( * ) Notice: Subject to any disclaimer, the term of this patent is extended or adjusted under 35 U.S.C. 154(b) by 291 days.

(21) Appl. No.: 18/594,071

(22) Filed: Mar. 4, 2024

(65) Prior Publication Data

US 2024/0313324 A1 Sep. 19, 2024

(30) Foreign Application Priority Data

Mar. 13, 2023 (EP) ..................................... 23161464

(51) Int. Cl.
| | |
|---|---|
| *H01M 50/249* | (2021.01) |
| *B60K 1/04* | (2019.01) |
| *H01M 10/613* | (2014.01) |
| *H01M 10/6554* | (2014.01) |
| (Continued) | |

(52) U.S. Cl.
CPC ............ *H01M 50/249* (2021.01); *B60K 1/04* (2013.01); *H01M 10/613* (2015.04); *H01M 10/6554* (2015.04); *H01M 50/233* (2021.01); *H01M 50/264* (2021.01); *B60K 2001/0438* (2013.01); *H01M 2220/20* (2013.01)

(58) Field of Classification Search
CPC ............. H01M 50/249; H01M 50/264; H01M 50/289; H01M 50/271; H01M 50/147; H01M 50/50; H01M 50/502; H01M 10/6554; H01M 10/625; B60K 1/04; B62D 21/03

See application file for complete search history.

(56) References Cited

U.S. PATENT DOCUMENTS

| | | | | |
|---|---|---|---|---|
| 9,227,582 B2 * | 1/2016 | Katayama | ............. | H01M 50/24 |
| 10,688,854 B2 * | 6/2020 | Caliskan | .................. | B60K 1/04 |
| | (Continued) | | | |

FOREIGN PATENT DOCUMENTS

| | | | | |
|---|---|---|---|---|
| DE | 102016115647 B3 * | 12/2017 | ......... | H01M 50/264 |
| DE | 102021109394 A1 | 10/2022 | | |
| WO | 2019/016081 A1 | 1/2019 | | |

OTHER PUBLICATIONS

European Search Report for EP 23161464.5 mailed Sep. 19, 2023.

*Primary Examiner* — Steve Clemmons
(74) *Attorney, Agent, or Firm* — Jordan IP Law, LLC; Todd A. Vaughn

(57) ABSTRACT

A motor vehicle having a high-voltage battery, and a method of manufacturing such a motor vehicle. The high-voltage battery includes a battery housing having a tank defined by at least lateral tank walls and a tank cover to cover the lateral tank walls at an upper region of the lateral tank walls and which leaves an open at a bottom region of the tank that is covered by a carrier plate forming the base of the high-voltage battery, and a plurality of battery cells mounted vertically on the carrier plate in the battery housing such that electrical contacts of the battery cells are oriented upwardly and cell bases of the battery cells are oriented downwardly.

18 Claims, 3 Drawing Sheets

(51) Int. Cl.
    *H01M 50/233*        (2021.01)
    *H01M 50/264*        (2021.01)

(56)            References Cited

U.S. PATENT DOCUMENTS

2014/0338999 A1    11/2014   Fujii et al.
2024/0157816 A1*   5/2024   Stawiarski ............. B60L 50/64

\* cited by examiner

MOTOR VEHICLE WITH A HIGH VOLTAGE BATTERY

CROSS-REFERENCE TO RELATED APPLICATIONS

The present application claims priority under 35 U.S.C. § 119 to European Patent Publication No. EP 23161464.5, filed on Mar. 13, 2023, which is hereby incorporated by reference in its complete entirety.

TECHNICAL FIELD

The present disclosure relates to a motor vehicle having a high-voltage battery, and to a method for manufacturing such a motor vehicle.

BACKGROUND

It is known that high-voltage batteries can be installed in motor vehicles, in particular as traction batteries to provide electrical energy for driving the motor vehicle. The battery then has a battery housing that accommodates the cell modules. Battery housings are usually made up of various individual parts. The battery housing is installed in an underbody via bolts, and can be demounted. The tightness of the vehicle body is ensured by corresponding components in the floor assembly and is not dependent on the battery housing. Other than at the bolt points, there is usually a gap of at least a few millimetres between the battery and the vehicle structure, in order to prevent rubbing during operation (noise, corrosion . . . ), but also to enable collision-free mounting. For servicing or repair, it is necessary for the entire battery unit to be removed from the vehicle.

SUMMARY

It is an object of the disclosure to specify a motor vehicle having a high-voltage battery, the high-voltage battery having a small installation space requirement, such that the energy content in the high-voltage store can be increased, and thus the range of the vehicle is extended, while the weight and manufacturing costs are also low. A further object is to specify a simple and cost-effective method for the manufacture of such a motor vehicle.

The object is achieved by a motor vehicle having a high-voltage battery, the high-voltage battery comprising a battery housing, the battery housing comprising at least lateral walls and a cover that covers the lateral walls at the top, there being a plurality of battery cells arranged in the battery housing, the lateral walls and the cover being realized in one piece by a tank that is open at the bottom, a carrier plate forming the base of the high-voltage battery that covers the tank on its underside, the battery cells being mounted vertically on the carrier plate such that the electrical contacts of the battery cells are oriented upwards and the cell bases are oriented downwards.

In accordance with the disclosure, a high-voltage storage device has a battery housing that, in contrast to conventional construction methods, does not use separate lateral housing or frame components or a separate cover, but rather a tank, which realizes the lateral walls and the cover of the battery housing, which is on top when in the installed position in the vehicle. This inverted tank may be easily and inexpensively fitted with additional battery components such as, in particular, battery cells, and built into the vehicle body in a structurally integrated manner. This tank may at the same time seal off the floor assembly from below. The tank may be directly flush with the floor panel of the vehicle and/or realize the floor panel in some areas, for example. A significant advantage of this solution is the gain in installation space in the Z-direction, as the air gap that usually has to be maintained between the battery cover and the floor panel can be omitted here. Dispensing with separate components, such as a separate battery cover or separate lateral parts, or frame components, can also offer an advantage in terms of a cost and weight.

The battery cells may be mounted in a simple and cost-effective manner on a carrier plate, which forms the base of the battery housing. After the carrier plate has been fitted with the battery cells, and preferably after the battery cells have been electrically connected, the fully fitted carrier plate may be joined to the tank, in particular bolted in order to close the battery housing. The finished high-voltage battery may then be fitted into a vehicle body, preferably by use of mechanical joining elements such as bolts or rivets, in addition to an assembly adhesive, such that continuous vehicle production is possible without the vehicle having to be discharged in order for the adhesive to harden.

Developments of the disclosure are specified in the dependent claims, the description and the accompanying drawings.

Preferably, the battery cells are mounted vertically on a cell carrier, the cell carrier being realized integrally from the carrier plate or being joined to the carrier plate. The battery cells are thus mounted on the carrier plate indirectly, via the cell carrier.

Particularly preferably, there is at least one or a plurality of flat cooling plates arranged on the cell carrier, beneath the battery cells.

The carrier plate preferably realizes an under-run protection plate of the motor vehicle. The battery cells may be accessed from below via the preferably demountable carrier plate, which also serves as an under-run protection.

Preferably, the cover of the tank forms a floor panel of the motor vehicle and/or the cover of the tank is fastened from below to a floor panel, in particular is bolted and/or adhesive-bonded. The cover of the tank may realize, for example, the floor panel in some areas and be joined to a floor panel in other areas, in particular at the edges.

The cover of the tank may have fastening points for seat crossmembers.

Seat crossmembers are preferably fastened to the tank, in particular adhesive-bonded and/or bolted to the cover of the tank.

Preferably, the tank is mounted from below, preferably adhesive-bonded and bolted, on another support structure of the motor vehicle, preferably on lateral sills of the motor vehicle. The sill may be manufactured, for example, in a shell design. The tank may then be joined to one or more shells of the sill, preferably adhesive-bonded and/or bolted in each case.

The tank, in particular, lateral walls of the tank, may realize part of the support structure of the motor vehicle, preferably of the lateral sills of the motor vehicle. For example, a shell of the sill may be formed by a lateral wall of the tank.

Preferably, a plurality of crossmembers of the support structure of the motor vehicle are arranged within the tank of the high-voltage battery. The crossmembers may be welded to the cell carrier or be realized integrally.

Preferably, the battery cells are each mounted vertically on the crossmembers, in the interspaces between the crossmembers, such that a plurality of parallel rows of battery cells extend between the crossmembers.

The battery cells may be mounted individually in the tank, or mounted grouped together in battery-cell modules in the tank. The high-voltage battery may thus have vertically mounted battery modules.

A method in accordance with the disclosure for manufacturing a motor vehicle, as described above, may provide that the tank is manufactured as a die-cast component, in particular in a so-called "megacasting" process, with fastening points for seat crossmembers preferably already being integrated into the tank during manufacture of the tank.

A method in accordance with the disclosure for manufacturing a motor vehicle, as described above, may provide that in a pre-assembly process the battery cells are placed on the carrier plate, in particular inserted into the cell carrier, then the carrier plate is joined to the tank, for the purpose of manufacturing the high-voltage battery, and then the pre-assembled high-voltage battery is mounted from below in another support structure of the motor vehicle, preferably is fastened to lateral sills of the motor vehicle.

At least one flat cooling element, i.e., a cooling plate, may be arranged, for example inserted, on the carrier plate before the battery cells are mounted. The battery cells are then inserted on the carrier plate, in particular into the cell carrier. The battery cells may then be interconnected.

The carrier plate and tank may then be bolted together. The cell carrier may be made as a one-piece cast part together with the carrier plate, or also as a multi-part welded assembly, or also as a combination of materials—for example, the carrier plate made of fibre-reinforced material such as glass-reinforced plastic, and the cell carrier made of metal, in particular aluminium.

After the carrier plate has been bolted to the tank to form the housing, the cells may be contacted, through a cutout, to plug connections on the end face of the housing. A closing plate, which also comprises the connectors, may then be bolted to the housing in a gas-tight manner.

The pre-assembling of the battery housing may be effected in the uninstalled state, outside of the vehicle to be manufactured.

The pre-assembled battery may be brought to an assembly line and fitted into the vehicle from below via standard manipulation devices.

The pre-assembled high-voltage battery may be mounted from below in another support structure of the motor vehicle, preferably fastened, for example bolted, to lateral sills of the motor vehicle.

DRAWINGS

The disclosure is described below on the basis of examples, with reference to the drawings.

DESCRIPTION

Figure 1:
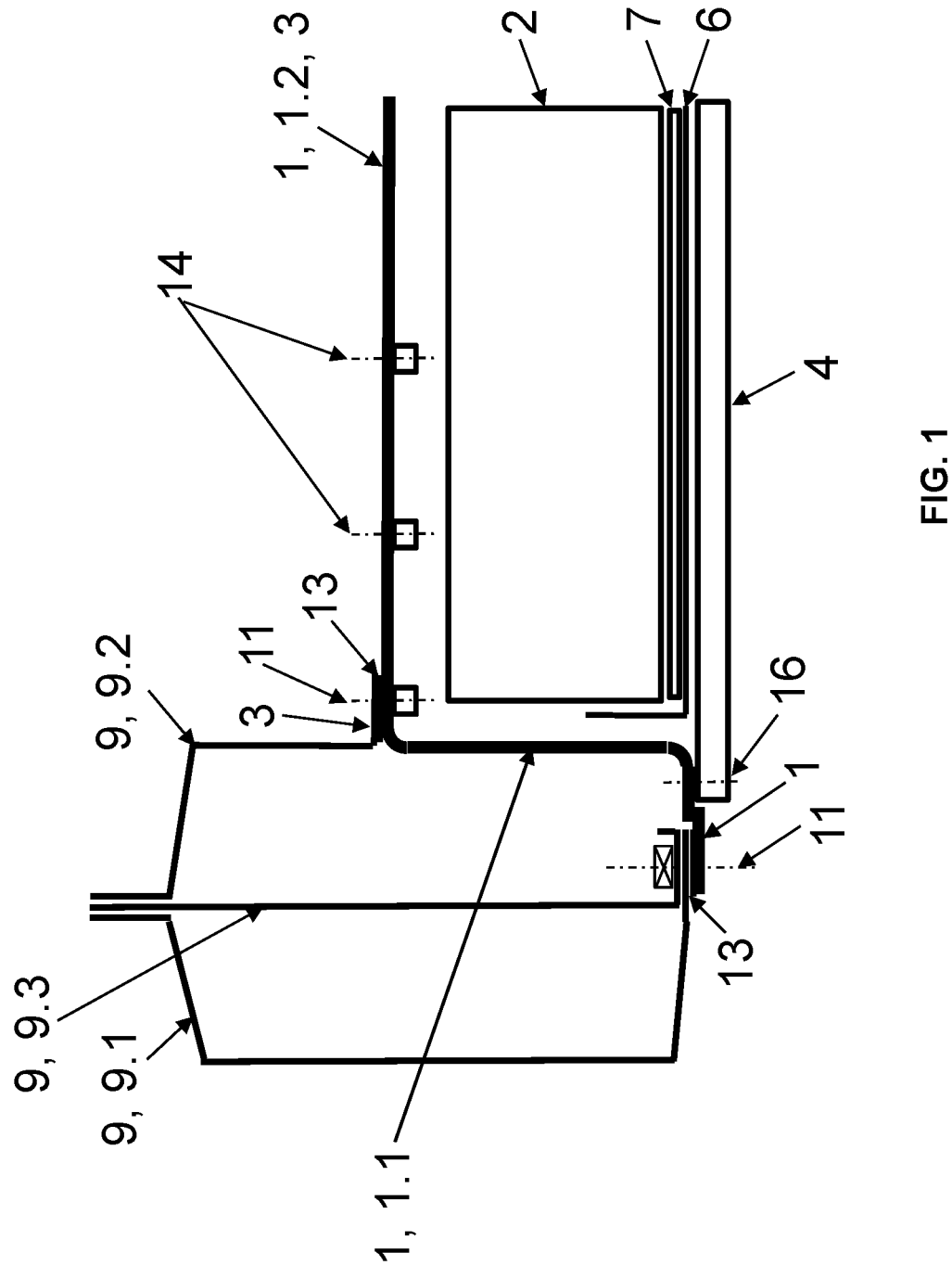
FIG. 1 is a sectional view of part of a motor vehicle in accordance with the disclosure, in the transverse direction of the vehicle (X-section).
Figure 2:
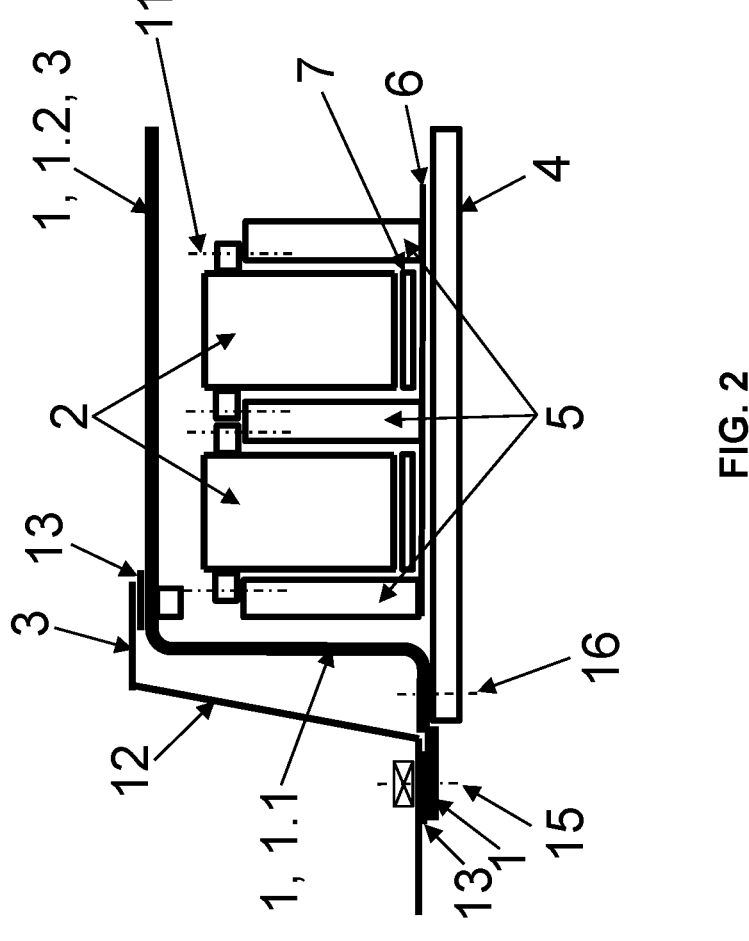
FIG. 2 is a sectional view of part of a motor vehicle in accordance with the disclosure, in the longitudinal direction of the vehicle (Y-section).

FIG. 1 is a schematic representation, in the transverse direction, of a high-voltage battery in a tank 1 of a motor vehicle in accordance with the disclosure. The vehicle is thus viewed from the front. In FIG. 2, the same vehicle is represented in a section normal to the section of FIG. 1, i.e., in the longitudinal direction of the vehicle, viewed from the side.

The motor vehicle represented in cutaway form comprises a high-voltage battery comprising a battery housing, the battery housing comprising lateral walls 1.1 and a cover 1.2 that covers the top of the lateral walls 1.1. The lateral walls 1.1 and the cover 1.2 are realized in one piece by a tank 1 that is open at the bottom.

There is a plurality of battery cells 2 arranged in the battery housing, i.e., in the tank 1. The battery cells 2 are mounted vertically within the tank 1, on a carrier plate 4, such that the electrical contacts of the battery cells 2 are oriented upwards and the cell bases are oriented downwards.

The battery cells 2 are mounted on a cell carrier 6, which is joined to the carrier plate 4 or realized integrally.

Arranged on the cell carrier 6, beneath the battery cells 2, there are flat cooling plates 7.

The cover 1.2 of the tank 1 forms a floor panel 3 of the motor vehicle and is fastened at the lateral edges from below to a further, edge floor panel 3, namely bolted via bolted connections 11 and additionally adhesive-bonded via adhesive 13 between the edge floor panel 3 and the cover 1.2 of the tank 1. The edge floor panel 3 may be realized by the sill 9, in particular by an inner top shell of the sill 9.2.

The cover 1.2 of the tank 1 has fastening points 14 for seat crossmembers. Seat crossmembers may be fastened directly to the tank 1, in particular bolted to the cover 1.2.

The tank 1 is fastened to a lateral sill 9 of the motor vehicle, namely mounted from below. The fastening of the tank 1 to the sill 9 is effected via adhesive 13 and a bolted connection 11. The fastening to the sill 9 may be effected on a lateral edge of the tank 1 that realizes a flange parallel to the roadway and to the cover 1.2. In FIG. 1, the tank 1 is fastened to a shell 9.1 of the sill 9 that realizes the outside of the sill 9. An additional fastening of the tank 1 is effected, as described above, via a shell 9.2 of the sill 9, which may be located on the inside and realize an upper part of the sill 9. A lower part of the inside of the sill 9 may be realized by the lateral walls 1.1 of the tank 1. The sill 9 may additionally have a central stiffener or shell 9.3. The central shell 9.3 may likewise be fastened to the tank 1.

The tank 1, in particular lateral walls 1.1 of the tank 1, thus realizes part of the support structure of the motor vehicle, namely of the lateral sills 9 of the motor vehicle.

A plurality of crossmembers 5 of the support structure of the motor vehicle are arranged within the tank 1 of the high-voltage battery, and the crossmembers 5 may be realized integrally with the cell carrier 6.

As shown clearly in FIG. 2, the battery cells 2 are each mounted on the crossmembers 5, in the interspaces between the crossmembers 5, such that a plurality of parallel rows of battery cells 2 extend between the crossmembers 5. The battery cells 2 may be fastened to the crossmembers 5 via mechanical joining elements 11, such as bolts, for example.

The carrier plate 4 forms the base of the high-voltage battery that covers the underside of the tank 1.

Figure 3:
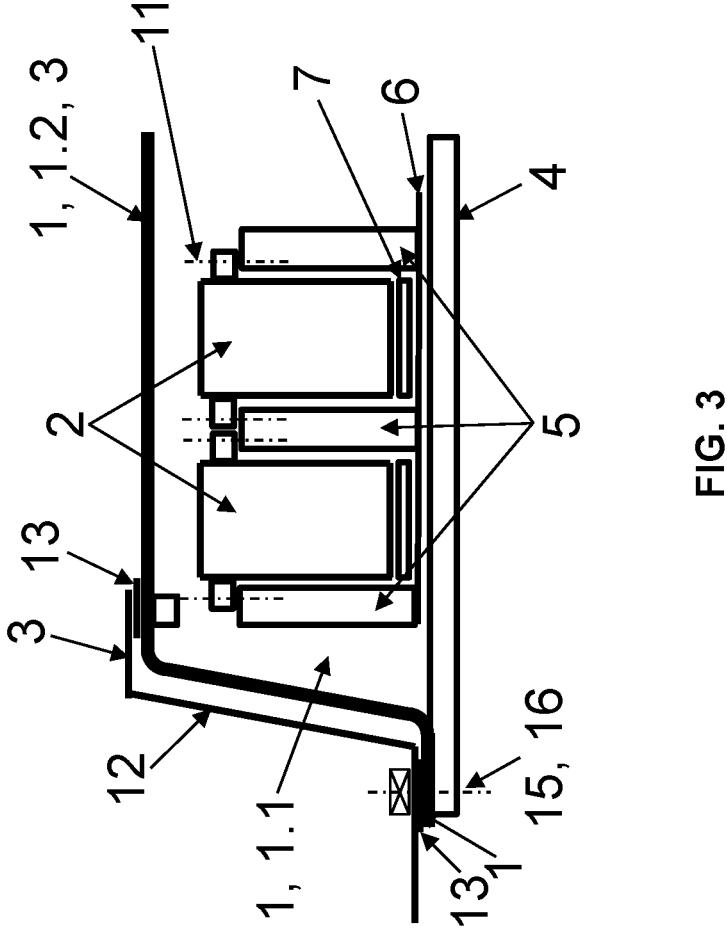
FIG. 3 is a sectional view of part of a further motor vehicle in accordance with the disclosure, in the longitudinal direction of the vehicle (Y-section), in an alternative embodiment.

In the embodiment shown in FIG. 3, the fastening points 16 of the carrier plate 4 are at the same Y position as the fastening points 15 of the tank 1, in particular the cast tank. The carrier plate 4 has cutouts at the bolt positions of the tank 1 so that it can be joined. The advantage of this design is the improved flow of force in the event of a lateral impact, and an even larger interior of the battery housing. In the design shown in FIG. 2, the fastening points 16 of the carrier plate are located in the Y direction between the fastening points 15 of the tank.

In contrast to conventional construction methods, in accordance with the disclosure a battery housing is thus fitted like an inverted tank 1 into a vehicle body in a structurally integrated manner, and at the same time closes off a floor assembly from below. An assembly adhesive system with adhesive 13 is used in this case to join the tank 1, in combination with mechanical joining elements 11, such as bolts, rivets, etc. The mechanical joining points 11 allow continuous production of the vehicles without the vehicle having to be discharged in order for the adhesive 13 to harden.

The battery modules 2 in this case are arranged vertically on a carrier plate 4 having an integrated cell carrier 6, and are fitted from below. The carrier plate 4 is also designed as an under-run protection and can be demounted again.

The pre-assembling of the battery housing is effected in the uninstalled state. Firstly, the cooling plates 7 are inserted into the cell carrier 6, then the cells 2 are inserted into the cell carrier from above and electrically connected to each other. Finally, the carrier plate 4 and the tank 1 are bolted together. The cell carrier 6 may be made as a one-piece cast part together with the carrier plate 4, or also as a multi-part welded assembly, or also as a combination of materials, for example the carrier plate 4 made of glass-reinforced plastic, and the cell carrier 6 made of aluminium.

After the carrier plate 4 has been bolted to the tank 1, the cells 2 are contacted, through a cutout, to plug connections on the end face of the housing. A closing plate, which also comprises the connectors, is then bolted to the housing in a gas-tight manner.

The battery tank 1 may be made as a one-piece die-cast component (megacasting), which may already have the seat fastening points 14 integrated. In addition, necessary attachment points for components in the interior may already be included in the casting.

A significant advantage of this arrangement is the gain in installation space in the Y direction, by the cross-section normally required by a battery frame, as well as the integration of a plurality of components and the associated savings in individual parts and joining technology.

The Z-dimension chain is also smaller due to the absence of an air gap between the base plate and the battery housing. The elimination of the battery frame further reduces costs and weight. Servicing or repair of the battery cells 2 may be performed from above when the carrier plate 4 has been removed.

LIST OF REFERENCE SYMBOLS

1 tank
1.1 lateral wall of tank
1.2 tank cover
2 battery cells
3 floor panel
4 carrier plate
5 crossmember
6 cell carrier
7 cooling plate
9 sill
9.1 sill, outer
9.2 sill, inner top
9.3 sill, central
11 bolted connection
12 support structure

13 adhesive
14 fastening points for seat crossmembers
15 fastening points, tank
16 fastening points, carrier plate

What is claimed is:

1. A motor vehicle comprising:
a high-voltage battery including a battery housing having a tank defined by at least lateral tank walls and a tank cover to cover the lateral tank walls at an upper region of the lateral tank walls, and which leaves an open at a bottom region of the tank that is covered by a carrier plate forming the base of the high-voltage battery, wherein the lateral tank walls and the tank cover are formed as a single, unitary component;
lateral sills upon which the tank is mounted from below, wherein the lateral tank walls form at least part of the lateral sills; and
a plurality of battery cells mounted vertically on the carrier plate in the battery housing such that electrical contacts of the battery cells are oriented upwardly and cell bases of the battery cells are oriented downwardly.

2. The motor vehicle of claim 1, further comprising a cell carrier integrally formed with the carrier plate and upon which the battery cells are mounted vertically.

3. The motor vehicle of claim 1, further comprising a cell carrier attached to the carrier plate and upon which the battery cells are mounted vertically.

4. The motor vehicle of claim 3, further comprising a plurality of cooling plates arranged on the cell carrier and beneath the battery cells.

5. The motor vehicle of claim 3, further comprising a plurality of crossmembers of a support structure of the motor vehicle that are arranged within the tank.

6. The motor vehicle of claim 5, wherein the crossmembers are integrally formed with the cell carrier.

7. The motor vehicle of claim 5, wherein the crossmembers are welded to the cell carrier.

8. The motor vehicle of claim 7, wherein each battery cell is mounted vertically on the crossmembers in spaces between adjacent crossmembers, such that a plurality of parallel rows of battery cells extend between the crossmembers.

9. The motor vehicle of claim 1, wherein the carrier plate forms an under-run protection plate of the motor vehicle.

10. The motor vehicle of claim 1, wherein the tank cover forms a floor panel of the motor vehicle.

11. The motor vehicle of claim 1, wherein the tank cover is fastened from below to a floor panel.

12. The motor vehicle of claim 1, wherein the tank cover has fastening points to facilitate connection of seat crossmembers to the tank cover.

13. A method of manufacturing the motor vehicle of claim 1, the method comprising:
forming the tank as a die-cast component via a megacasting process such that fastening points for seat crossmembers are integrated into the tank.

14. The method of claim 13, further comprising:
inserting, in a pre-assembly process, the battery cells into the carrier plate;
attaching, after inserting the battery cells into the carrier plate, the carrier plate to the tank; and
mounting the high-voltage battery from below on lateral sills of the motor vehicle.

15. A high-voltage battery for a motor vehicle having lateral sills, the high-voltage battery comprising:
a battery housing having a tank mounted from below upon the lateral sills, the tank being defined by at least lateral tank walls and a tank cover to cover the lateral tank walls at an upper region of the lateral tank walls and which leaves an open at a bottom region of the tank that is covered by a carrier plate forming the base of the high-voltage battery, wherein the lateral tank walls and the tank cover are formed as a single, unitary component, and wherein the lateral tank walls form at least part of the lateral sills; and a plurality of battery cells mounted vertically on the carrier plate in the battery housing such that electrical contacts of the battery cells are oriented upwardly and cell bases of the battery cells are oriented downwardly.

16. The high-voltage battery of claim 15, further comprising a cell carrier attached to the carrier plate and upon which the battery cells are mounted vertically.

17. The high-voltage battery of claim 16, further comprising a plurality of cooling plates arranged on the cell carrier and beneath the battery cells.

18. The high-voltage battery of claim 15, wherein the tank cover forms a floor panel of the motor vehicle.

* * * * *